United States Patent [19]

Lienhard et al.

[11] B 4,008,211

[45] Feb. 15, 1977

[54] BETAINIC AZO DYESTUFFS CONTAINING COBALT IN COMPLEX UNION WITH A COLORLESS, TRIDENTATE LIGAND

[75] Inventors: Paul Lienhard, Riehen near Basel; Fabio Beffa, Basel; Charles Soiron, Riehen near Basel, all of Switzerland

[73] Assignee: Ciba-Geigy AG, Basel, Switzerland

[22] Filed: July 30, 1973

[21] Appl. No.: 383,697

[44] Published under the second Trial Voluntary Protest Program on February 17, 1976 as document No. B 383,697.

Related U.S. Application Data

[60] Continuation of Ser. No. 57,017, June 9, 1970, abandoned, which is a division of Ser. No. 496,651, Oct. 15, 1965, abandoned.

[30] Foreign Application Priority Data

Oct. 20, 1964  Switzerland .................... 13579/64

[52] U.S. Cl. ..................................... 260/147; 8/26; 260/146 R; 260/148; 260/149; 260/150; 260/151
[51] Int. Cl.² ................. C09B 45/20; C09B 45/30; D06P 3/24
[58] Field of Search ............... 260/146 R, 147, 148, 260/149, 150, 151

[56] References Cited

UNITED STATES PATENTS

| | | | |
|---|---|---|---|
| 2,814,614 | 11/1957 | Zickendraht | 260/145 B |
| 2,826,573 | 3/1958 | Strobel et al. | 260/147 |
| 3,030,353 | 4/1962 | Kuster | 260/147 |
| 3,051,696 | 8/1962 | Dettwyler | 260/147 |
| 3,538,073 | 11/1970 | Mack et al. | 260/150 X |

*Primary Examiner*—Floyd D. Higel
*Attorney, Agent, or Firm*—Wenderoth, Lind & Ponack

[57] ABSTRACT

Betainic complex azo dyestuff-cobalt compound consisting essentially of, per molecule:
  a cobalt atom;
  one molecule of a colorless tridentate organic ligand which is coordinatively bound to said cobalt atom by way of three nitrogen atoms which is free from ionogenic groups which do not partake in complex formation, each of said nitrogen atoms participating in the formation of a 5- to 6- membered ring of which said cobalt atom is a member; and
  one radical of a mono- or dis- azo dyestuff capable of forming a bicyclic metal complex with cobalt and containing one sulphonic acid group, whereby a complex dyestuff-cobalt compound is formed which has the character of an inert salt (betaine), are disclosed. These compounds are useful for the dyeing and/or pigmenting of polymeric and copolymeric organic material, e.g., lacquers, synthetic plastics or spinning masses, as well as for the dyeing of polyamide fibers from weekly acid bath.

7 Claims, No Drawings

BETAINIC AZO DYESTUFFS CONTAINING COBALT IN COMPLEX UNION WITH A COLORLESS, TRIDENTATE LIGAND

This is a continuation application of application Ser. No. 57,017, filed June 9, 1970, (now abandoned) which is a divisional of application Ser. No. 496,651, filed Oct. 15, 1965, now abandoned.

The present invention concerns new cobalt-containing azo dyestuffs, a process for the production thereof, their use for the dyeing of organic fiber materials or for the dyeing and pigmenting of non-fibrous polymeric organic materials, as well as, as industrial products, the organic materials dyed or pigmented with the new cobalt-containing azo dyestuffs.

It has been found that valuable, strongly colored and light-fast cobalt-containing azo dyestuffs are obtained by reacting a complex cobalt (III) compound containing per cobalt atom two molecules of a colorless tridentate, organic ligand which is bound in complex linkage to the cobalt atom by way of bridges free from —COO— or —O—, but preferably via trivalent nitrogen atoms of said ligand having an electronic pair available for complex coordination bonding to cobalt, with an azo dyestuff capable of forming bicyclic metal complexes with cobalt, whereby complex azo dyestuff-cobalt compounds which contain a colorless, tridentate, organic ligand of the type mentioned above bound in complex linkage, are produced. The starting cobalt (III) complex compounds are referred to hereinafter as "complex $Co^{III}$-ligand compounds."

The colorless, tridentate ligand in the starting complex $Co^{III}$-ligand compound is preferably bound to the cobalt atom by way of three nitrogen atoms, wherein each of these nitrogen atoms is, for instance, in a primary or a secondary or tertiary amino group, e.g. an amino group substituted as defined below or a piperidino, C-pyridyl, C-quinonyl, triazinyl or C,C-pyridylene group, a substituted or unsubstituted imino group, nitrilo group, oximido group, hydrazino group or hydrazone group, substitution of said substituted amino and imino groups preferably being by a member selected from the group consisting of lower alkyl, phenyl, benzyl or cyclohexyl.

The cobalt-complexing nitrogen atoms in the ligand molecule are advantageously separated from one another by a two- or three-membered, saturated or unsaturated sequence consisting of carbon atoms or carbon and nitrogen atoms, each of the cobalt-complexing nitrogen atoms and the aforesaid sequence of atoms can be part of a ring or ring system which is preferably five- or six-membered.

Examples of such ligands described by using the nomenclature according to F. P. Dwyer and D. P. Mellor, "Chelating agents and metal chelates," pages 144 et seq. are:

N,N-bis(β-phenylaminoethyl)-N-ethylamine, N,N''-dibenzyldiethylenetriamine, N,N-bis-(β-N'-piperidinoethyl)-N-ethylamine, 1-amino-2-(β-aminoethylamino)-cyclohexane, 2,2'-diaminodicyclohexylamine, 1-amino-2-(β-amino-ethylamino)-benzene, 2,2'-diamino-diphenylamine, 2,6-(di-2'-pyridyl)-pyridine, ("Terpyridyl"), 8-(2'-amino-phenylamino)-quinoline, (2-pyridylmethylene-aminoethyl)-diethylamine, 1-(diethylamino)-2-(2'-pyridyl-methylene-amino)-benzene, 1-(dimethylamino)-2-(2'-pyridyl-methyleneamino)-cyclohexane, 2-(2'-pyridyl-methylene-amino-methyl)-pyridine, 8-(2'-pyridyl-methyleneamino)-quinoline, 2,6-bis-(benzylaminomethylene)-pyridine, 2,6-bis-(aminomethyl)-pyridine, pyridine-2,6-dialdehyde dioxime, pyridine-2,6-dialdehyde-dihydrazone, 2-methoxy-4,6-dihydrazino-1,3,5-triazine, 2-amino-4,6-dihydrazino-1,3,5-triazine.

The most important ligands are dialkylenetriamines and triaminoalkanes due to the particularly good stability of the complexes containing them. Examples of dialkylenetriamines are diethylenetriamine, monoethylene-monopropylenetriamine, dipropylenetriamine and their N-alkylated products; examples of triaminoalkanes are: α,β,γ-triaminopropane, α,β,δ-triaminobutane or α,γ-diamino-β-(aminomethyl)propane.

Diethylenetriamine is particularly preferred amongst ligands which contain three nitrogen-containing groups as complex-forming groups. This ligand produces very stable cobalt-containing azo dyestuffs at good yield rates.

In the complex $Co^{III}$-ligand compound used as starting material, the two ligands can be identical or different: preferably they are identical and belong to the class of dialkylenetriamines and triaminoalkanes. Preferred complex $Co^{III}$-ligand compounds are water-soluble bis-(diethylenetriamine)-cobalt(III) salts, e.g. the corresponding chloride, bromide, sulfate, perchlorate or acetate.

The complex $Co^{III}$-ligand compounds used as starting materials are produced, for example, by reacting the colorless ligand with a cobalt(III) salt such as cobalt (III) hexamine trichloride in aqueous or aqueous-organic solution. Instead of cobalt(III) salts, also cobalt(II) salts can be used, for example, cobalt(II) chloride, sulfate or acetate. In this case, subsequent oxidation to form the $Co^{III}$-ligand compound is necessary. Mainly atmospheric oxygen or hydrogen peroxide are used as oxidizing agents.

Azo dyestuffs which are capable of forming bicyclic metal complexes and hence are usable according to the invention are well known, or can be produced by well-known methods. Especially those azo dyestuffs are useful which fall under the formula

$$D-N=N-E \quad \text{with } X, X' \text{ substituents} \tag{I}$$

In this formula
D represents a radical of the benzene or naphthalene series wherein X is in a position adjacent to the azo bridge,
E represents the radical of a coupling component coupling in a position ortho to X',
X represents hydroxyl, carboxyl, an alkylsulfonamido group, e.g. the methylsulfonamido, or an arylsulfonamido group, wherein "aryl" is preferably mononuclear, e.g. the p-methylphenylsulfonamido group, or a substituent which can be converted into such a group, and
X' represents a hydroxyl group or a primary or secondary amino group.

Preferably, D is a radical of the benzene series; E represents, e.g. the radical of a benzene, naphthalene, 1-aryl-pyrazole or acyloacetarylamide compound.

D and E can contain the substituents usual in dyestuffs, for example, nucleophilic substituents such as hydrocarbon radicals, particularly lower alkyl groups, ether groups, preferably lower alkoxy groups, or acylamino groups, e.g. alkanoylamino, aroylamino, alkylsulfonylamino, arylsulfonylamino or carbalkoxyamino groups; or electrophilic substituents such as halogens, e.g. fluorine, chlorine or bromine, carboxyl groups and sulfonic acid groups, or functional derivatives thereof, e.g. carboxylic and sulfonic acid amide groups optionally mono- or di-substituted at the nitrogen atom preferably with lower alkyl, phenyl or cyclohexyl, or carboxylic acid ester groups such as lower alkoxy-carbonyl or phenoxy-carbonyl radicals, or sulfonic acid aryl ester groups, nitro, cyano or trifluoromethyl groups, arylazo groups such as phenylazo or naphthylazo groups, or acyl groups such as alkanoyl, aroyl, alkylsulfonyl or arylsulfonyl groups.

The aromatic rings which may be present in these substituents can be accordingly substituted in their turn by the aforesaid substituents.

Lower alkoxy groups such as methoxy or ethoxy groups, or acyloxy groups, e.g. lower alkanoyloxy groups, or (mononuclear aryl) sulfonyloxy groups such as the p-toluyl-sulfonyloxy group, are examples of the case when X in Formula I is a substituent which can be converted into a hydroxyl group. If X is a substituent which can be converted into a carboxyl group then it is, for example, a carboxylic acid ester group, particularly a lower alkoxy-carbonyl group. If X is a substituent which can be converted into an alkylsulfonamido or arylsulfonamido group, then it represents, for example, a bis-(lower alkyl-sulfone)-amido or a bis-(mononuclear arylsulfone)-amido group. By "mononuclear aryl" as used in this specification and the appended claims there are meant phenyl, lower alkyl-phenyl, chloro-phenyl, bromophenyl, sulfophenyl, lower alkylsulfonylphenyl, phenylsulfonyl phenyl, nitro phenyl, methylsulfonylaminophenyl, lower alkanoylamino-phenyl, sulfamylphenyl, N-lower alkyl-sulfamylphenyl, N-hydroxy-lower alkyl-sulfamyl-phenyl, carboxyphenyl, hydroxyphenyl and sulfophenyl-sulfonylphenyl.

Preferably, X is a hydroxyl group and X' is a hydroxyl group, an unsubstituted amino group, a lower alkylamino or an arylamino, especially a phenylamino group.

The reaction according to the invention of the complex $Co^{III}$-ligand compound with the azo dyestuff is advantageously performed in weakly acid, neutral or alkaline solution or dispersion. Suitable solvents, depending on the type of complex $Co^{III}$-ligand compound as defined and on the substitution of the azo dyestuff, are water or organic solvents miscible therewith such as alkanols, e.g. methanol, ethanol or butanol, alkylene glycols, e.g. ethylene glycol, propylene glycols or diethylene glycol, or their monoethers, e.g. ethylene glycol monomethyl or monoethyl ether, also ketones such as acetone, fatty acid amides, e.g. formamide or dimethyl formamide, ethers, e.g. dioxan, or secondary or teriary nitrogen bases. Higher temperatures are often necessary for the reaction, but the reaction partners can also be reacted in the melt. As flux are suitable, e.g. salts of fatty acids such as sodium acetate, amides of fatty acids such as acetamide, also urea and thiourea and their N-substitution products.

One method of performing the invention is, for example, to react one mol of a complex $Co^{3+}$-ligand compound which contains, per cobalt atom, two molecules of a colorless, tridentate organic ligand bound in complex linkage to the atom by way of three nitrogen atoms and is, moreover, free from ionogenic groups not taking part in the complex formation, with one mol of an azo dyestuff capable of forming bicyclic metal complexes. A complex azo dyestuff-cobalt compound is obtained which contains one molecule of the above ligand and one molecule of azo dyestuff bound in complex linkage per cobalt atom.

If a complex $Co^{3+}$-ligand compound of the type mentioned in the previous paragraph is reacted with an azo dyestuff being free from groups which dissociate acid in neutral water and do not take part in the complex formation, then a complex azo dyestuff-cobalt compound is obtained which has a cationic character, i.e., a basic dyestuff is obtained.

Such new complex azo dyestuff-cobalt compounds are in the form of salts of strong inorganic or organic acids the anions of which are present at the time of the production. They are thus, especially, chlorides, bromides, sulfates or perchlorates. If desired, salts of other acids can also be produced by double decomposition, for example, oxalates by the addition of oxalic acid. Double salts can also be produced, e.g. with the dyestuff halides and corresponding zinc or cadmium salts.

These cationic dyestuffs are particularly suitable for the fast dyeing of polymeric and copolymeric acrylic fibers from aqueous solution.

If a complex $Co^{III}$-ligand compound as described hereinbefore is reacted with an azo dyestuff which contains one group which dissociates acid in neutral water but which does not take part in the complex formation, in particular the sulfonic acid group, a complex dyestuff-cobalt compound is obtained which has the character of an inner salt (betaine) and which is slightly soluble in water and in most organic solvents. Dyestuffs of this type can be used for the dyeing and/or pigmenting of polymeric and copolymeric organic material, e.g. of lacquers such as nitro lacquers or stoving lacquers, or synthetic plastics such as polyvinyl chloride or of spinning masses such as those composed of cellulose triacetate.

A particularly valuable method of performing the invention consists, for example, in dyeing polyamide fibers, especially wool or nylon, from a weakly acid aqueous bath with an azo dyestuff capable of forming bicyclic metal complexes, which dyestuff contains one group which dissociates acid in neutral water but takes no part in the complex formation, and after-treating the dyed goods in a weakly acid, neutral or weakly alkaline bath, with a $Co^{III}$-ligand compound as defined hereinbefore, which is, moreover, free from ionogenic groups not taking part in the complex formation. In this way, the corresponding complex azo dyestuff-cobalt compound is formed on and within the fiber, whereby dyeings with good fastness properties, especially wet and light fastness are obtained.

If a complex $Co^{III}$-ligand compound of the last-described type is reacted with an azo dyestuff which contains at least two groups which dissociate acid in neutral water and do not take part in the complex formation, preferably sulfonic acid groups, then a complex azo dyestuff-cobalt compound is obtained which has anionic character. These dyestuffs are also suitable for the fast dyeing of polyamide fibers, e.g. wool or leather, from aqueous, acid solution.

Another method consists in reacting one mol of a complex $Co^{III}$-ligand compound of the last-defined type, with 1½ mols of an azo dyestuff capable of forming bicyclic metal complexes, which dyestuff is free from groups which dissociate acid in neutral water and do not take part in the complex formation. In this way, complex dyestuff-cobalt compounds are obtained which contain one molecule of ligand and three molecules of azo dyestuff bound in complex linkage to each two cobalt atoms. These are salt-like compounds the cation of which is formed by one cobalt atom, one molecule of ligand and one molecule of azo dyestuff, and the anion of which is formed by one cobalt atom and two molecules of azo dyestuff. These dyestuffs are slightly soluble in water but are soluble in organic solvents miscible therewith, e.g. alkanols or ketones. They can be used, for example, as dyestuffs for lacquers.

The term "lower" as used in this specification in connection with "alkyl" and alkoxy" means that these radicals have from one to five carbon atoms.

The following non-limitative examples serve to illustrate the invention. The temperatures are given in degrees Centigrade; percentages are by weight unless expressly stated otherwise.

EXAMPLE 1

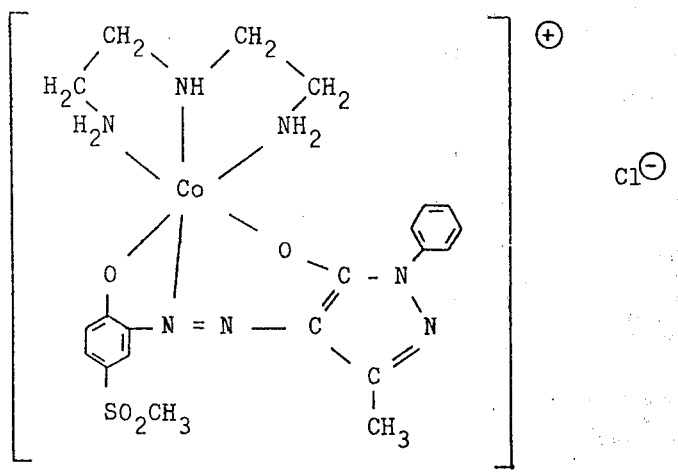

37.2 g of the azo dyestuff 1-hydroxy-2-amino-4-methylsulphonyl-benzene 1-phenyl-3-methyl-5-pyrazolone are dissolved in 250 ml of water and 50 ml of 2N sodium hydroxide solution at 80°. This solution is added dropwise to 450 ml of an aqueous solution at 80°–85° which contains bis-(diethylenetriamine)-cobalt(III) chloride (corresponding to 7.1 g of Co) and 45.0 g of sodium chloride.

The dyestuff of the above constitution precipitates. It is filtered off, washed with 20% sodium chloride solution and dried. It is a dark brown powder which dyes polyacrylonitrile fibres in orange shades which have good fastness to light.

If the reaction is performed as described above but if in replacement of 45.0 g of sodium chloride, first acetic acid is added until the reaction is acid to litmus paper and then 45.0 g of zinc chloride are added, then the corresponding zinc chloride double salt precipitates.

If, instead of the azo dyestuff mentioned above, one of the azo dyestuffs mentioned in column 2 of the following Table I is used and if, instead of bis-(diethylenetriamine)-cobalt(III) chloride, one of the cobalt chelates mentioned in column 3 of the same Table is used and otherwise the procedure given in the Example is followed, then complex cobalt dyestuffs having good fastness to light are also obtained. The shades are given in column 4 of the same Table.

| 1 No. | 2 azo dyestuff | 3 cobalt (III) chelate from | 4 shade on polyacrylonitrile fibres |
|---|---|---|---|
| 2. | 1-hydroxy-2-amino-4-methyl-sulphonyl-benzene → 1-phenyl-3-methyl-5-pyrazolone | dipropylene-triamine | orange |
| 3. | do. | N,N',N''-tri-ethyl-diethyl-enetriamine | do. |
| 4. | do. | N,N-bis-($\beta$-phenylamino-ethyl)-ethyl-amine | do. |
| 5. | do. | N,N-bis-($\beta$-N'-piperidino-ethyl)-ethyl-amine | do. |
| 6. | 1-hydroxy-2-amino-benzene-4-sulphonic acid amide 1-phenyl 3-methyl-5-pyrazolone | diethylene-triamine | do. |
| 7. | 1-hydroxy-2-amino-4-chlorobenzene → 1-(3' sulphamyl-phenyl)-3-methyl-5-pyrazolone | diethylene-triamine | do. → |
| 8. | 1-hydroxy-2-amino- | 1-amino-2-($\beta$- | do. |

TABLE I -continued

| No. | azo dyestuff | cobalt (III) chelate from | shade on polyacrylonitrile fibres |
|---|---|---|---|
| | 4-ethylsulphonyl-benzene → 1-(3'-chloro-phenyl)-3-methyl-5-pyrazolone | aminoethyl-amino)-cyclohexane | |
| 9. | do. | 1-amino-2-(β-aminoethyl-amino)-benzene | do. |
| 10. | 1-hydroxy-2-amino-4-phenylsulphonyl-benzene → 1-(4'-methyl-phenyl)-3-methyl-5-pyrazolone | 2,2'-diamino-diphenylamine | do. |
| 11. | do. | 2,2'-diamino-dicyclohexyl-amine | do. |
| 12. | 1-hydroxy-2-amino-4-ethylsulphonyl-benzene → 1-(3',4'-dichloro-phenyl)-3-methyl-5-pyrazolone | diethylene-triamine | do. |
| 13. | 1-hydroxy-2-amino-4-chloro-benzene → 1-(4'-methylsulphonyl-phenyl)-3-methyl 5-pyrazolone | 2,6-(di-2'-pyridyl)-pyridine ("Terpyridyl") | do. |
| 14. | 1-hydroxy-2-amino-4-chloro-benzene 1-(4'-methylsulphonyl-phenyl)-3-methyl-5-pyrazolone | 8-(2'-amino-phenylamino)-quinoline | do. |
| 15. | do. | dipropylene-triamine | do. |
| 16. | 1-hydroxy-2-amino-4-methylsulphonyl-benzene → 1-(3'-nitro-phenyl)-3-methyl-5-pyrazolone | (2-pyridyl-methylene-amino-ethyl)-diethyl-amine | do. |
| 17. | 1-hydroxy-2-amino-4-methylsulphonyl-benzene →1-(4'-methoxy-phenyl)-3-methyl-5-pyrazolone | 1-((diethylamino)-2-(2'-pyridyl-methyleneamino)-benzene | do. |
| 18. | do. | 1-(dimethylamino)-2-(2'-pyridyl-methyleneamino)-cyclohexane | do. |
| 19. | 1-hydroxy-2-amino-4-ethylsulphonyl-benzene → 1-phenyl-3-carbomethoxy-5-pyrazolone | 2-(2'-pyridyl-methylene-amino-methyl)-pyridine   x) | do. |
| 20. | do. | 8-(2'-pyridyl-methyleneamino)-quinoline | do. |
| 21. | 1-hydroxy-2-amino-4-ethylsulphonyl-benzene → 1-phenyl-3-carbomethoxy-5-pyrazolone | 2,6-bis-(benzyl-amino-methylene)-pyridine | do. |
| 22. | do. | 2,6-bis-(amino-methyl)-pyridine | do. |
| 23. | do. | pyridine-2,6-dialdehyde-dioxime | do. |
| 24. | do. | pyridine-2,6-dialdehyde-dihydrazone | do. |
| 25. | 1-hydroxy-2-amino-4-methylsulphonyl-benzene → 1-(2',5'-dichlorophenyl)-3-methyl-5-pyrazolone | α,β,γ-triamino-propane | do. |
| 26. | do. | α,β,δ-triamino-butane | do. |
| 27. | do. | α,γ-diamino-β-(amino-methyl)-propane | do. |
| 28. | do. | 2-methoxy-4,6-dihydrazino-1,3,5-triazine | do. |
| 29. | do. | 2-amino-4,6-dihydrazino- | do. |

Table I -continued

| 1 No. | 2 azo dyestuff | 3 cobalt (III) chelate from | 4 shade on poly- acrylonitrile fibres |
|---|---|---|---|
| | | 1,3,5-triazine | | x) Produced according to F. P. Dwyer and D. P. Meller, "Chelating agents and metal chelates", page 144 ff.

EXAMPLE 30

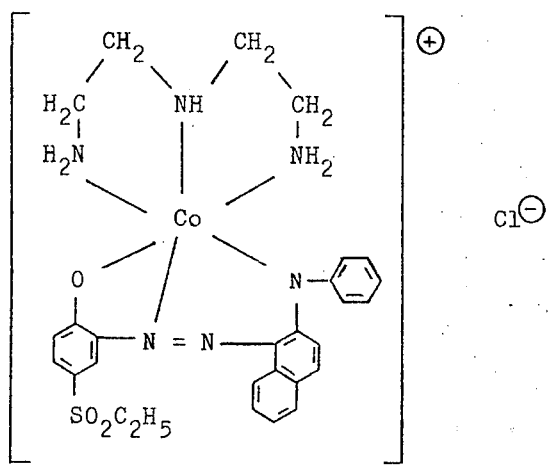

43.1 g of the azo dyestuff 1-hydroxy-2-amino-4-ethylsulphonyl-benzene → 2-phenylamino-naphthalene are dissolved in 400 ml of ethylene glycol monomethyl ether and 50 ml of 2N sodium hydroxide solution of 80°–90°. At the same temperature, an aqueous solution of bis-(diethylenetriamine)-cobalt(III) chloride, containing 7.1 g of cobalt is quickly added to the well stirred mixture. The colour of the mixture changes from red to blue. The complex cobalt dyestuff of the above formula is formed and partly precipitates.

The reaction mixture is poured into 2,000 ml of 10% sodium chloride solution whereupon this cobalt-containing dyestuff completely precipitates. The dyestuff is filtered off, washed with dilute sodium chloride solution and dried.

The cobalt dyestuff formed is a blue-black powder which dyes polyacrylonitrile fibres in light fast blue-grey shades.

If, instead of the azo dyestuff mentioned above, one of the azo dyestuffs mentioned in column 3 of the following Table II is used and, instead of bis-(diethylenetriamine)-cobalt(III) chloride one of the cobalt chelates given in column 3 is used, and otherwise the procedure given in the Example is followed, then complex cobalt-containing dyestuffs are also obtained. The dyestuffs have good fastness to light and the shades are given in column 4 of the same Table.

Table II

| 1 No. | 2 azo dyestuff | 3 cobalt(III) chelate from | 4 shade on poly- acrylonitrile fibres |
|---|---|---|---|
| 31. | 1-hydroxy-2-amino-4-nitro-benzene → 2-phenylamino-naphthalene | diethylene-triamine | blue-green |
| 32. | 1-hydroxy-2-amino-4-chloro-benzene → 2-phenylamino-naphthalene | dipropylene-triamine | blue-grey |
| 33. | 1-hydroxy-2-amino-4-methyl-benzene → 2-phenylamino-naphthalene | $\alpha,\beta,\gamma$-triamino-propane | do. |
| 34. | 1-hydroxy-2-amino-4-nitro-6-chloro-benzene →2-phenyl-amino-naphthalene | diethylene-triamine | blue-green |
| 35. | 1-hydroxy-2-amino-4-methyl-benzene → 2-ethylamino-naphthalene | diethylene-triamine | violet |
| 36. | do. | N,N',N''-tri-ethyl-diethyl-enetriamine | do. |
| 37. | 1-hydroxy-2-amino-4-chloro-benzene → 2-ethylamino-naphthalene | diethylene-triamine | blue-violet |
| 38. | do. | 1-amino-2-($\beta$-amino-ethyl-amino)-cyclohexane | do. |
| 39. | 1-hydroxy-2-amino-4-methylsulphonyl benzene →2-ethyl-amino-naphthalene | diethylene-triamine | blue-grey |
| 40. | do. | 1-amino-2-($\beta$-amino-ethyl-amino)-benzene | do. |
| 41. | 1-hydroxy-2-amino- | diethylene- | blue-green |

Table II-continued

| No. | azo dyestuff | cobalt(III) chelate from | shade on polyacrylonitrile fibres |
|---|---|---|---|
| | 4-nitro-benzene → 2-ethylamino-naphthalene | triamine | |
| 42. | do. | 2,2'-diamino-diphenylamine | do. |
| 43. | 1-hydroxy-2-amino-4,6-dinitrobenzene → 2-ethylamino-naphthalene | diethylene-triamine | green-grey |
| 44. | do. | 2,2'-diamino-dicyclohexyl-amine | do. |
| 45. | 1-hydroxy-2-amino-4,6-dichlorobenzene → 2-(β-hydroxy-ethylamine)-naphthalene | diethylene-triamine | blue-grey |
| 46. | 1-hydroxy-2-amino-4,6-dichlorobenzene → 2-(β-hydroxy-ethylamino)-naphthalene | α,β,δ-triamino-butane | blue-grey |
| 47. | 1-hydroxy-2-amino-4-methylsulphonyl-5-nitrobenzene → 2-(β-hydroxy-ethyl-amino)-naphthalene | diethylene-triamine | green-grey |
| 48. | do. | α,γ-diamino-β-aminomethyl-propane | do. |
| 49. | 1-hydroxy-2-amino-4-chlorobenzene → 2-hydroxy-naphthalene | diethylene-triamine | bordeaux |
| 50. | 1-hydroxy-2-amino-4-methylsulphonyl-benzene → 2-hydroxy-naphthalene | α,β,γ-triamino-propane | do. |
| 51. | 1-hydroxy-2-amino-4-nitrobenzene → 1-phenyl-3-methyl-5-pyrazolone | diethylene-triamine | orange |
| 52. | 1-hydroxy-2-amino-4-methylsulphonyl-benzene → 1-phenyl-3-methyl-5-amino-pyrazole | diethylene-triamine | red-brown |
| 53. | do. | dipropylene-triamine | do. |
| 54. | 1-hydroxy-2-amino-4-ethylsulphonyl-benzene → aceto-acetic acid-(2-chloroanilide) | diethylene-triamine | yellow |
| 55. | 1-hydroxy-2-(2'-hydroxy-phenylazo)-4-chloro-benzene | diethylene-triamine | red |
| 56. | 1-hydroxy-2-amino-4-nitro-benzene → 2-hydroxy-naphthalene | do. | bordeaux |
| 57. | 1-hydroxy-2-amino-4-methylsulphonyl-benzene → 2-hydroxy-naphthalene | do. | do. |
| 58. | 1-hydroxy-2-amino-4-ethylsulphonyl-benzene → 2-hydroxy-naphthalene | do. | do. |
| 59. | 1-hydroxy-2-amino-5-nitro-benzene → 2-hydroxy-naphthalene | do. | violet |
| 60. | 1-hydroxy-2-amino-4-methylsulphonyl-5-nitro-benzene → 2-hydroxy-naphthalene | do. | do. |
| 61. | 1-hydroxy-2-amino-5-nitro-benzene → 2-phenyl-amino-naphthalene | do. | blue-green |
| 62. | 1-hydroxy-2-amino-4-methyl-sulphonyl-benzene → 2-phenyl-amino-naphthalene | diethylene-triamine | blue-green |
| 63. | 1-hydroxy-2-amino- | do. | do. |

Table II-continued

| 1 No. | 2 azo dyestuff | 3 cobalt(III) chelate from | 4 shade on polyacrylonitrile fibres |
|---|---|---|---|
| 64. | 4-ethylsulphonyl-benzene → 2-phenyl-amino-naphthalene 7-amino-benzotria-zole-(1,2,3) → 2-hydroxy-naphthalene | do. | bordeaux |
| 65. | 1-amino-2-(methyl-sulphonyl-amino)-benzene → 2-hydroxy-naphthalene | do. | do. |

EXAMPLE 66

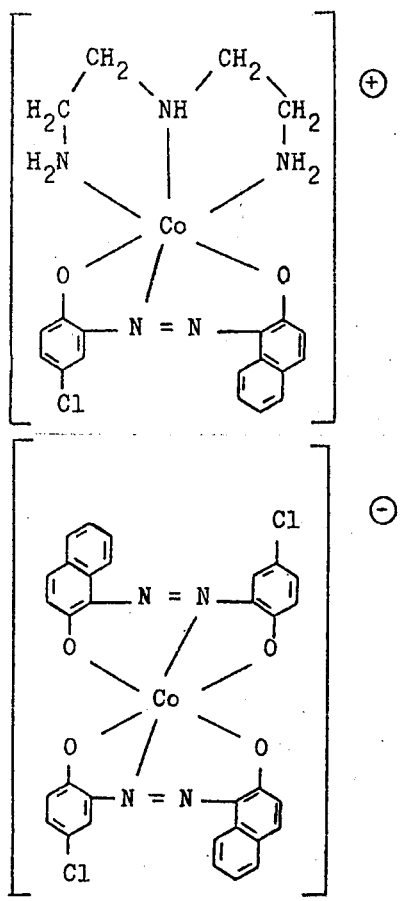

29.9 g of the azo dyestuff 1-hydroxy-2-amino-4-chlorobenzene → 2-hydroxy-naphthalene are dissolved in an 80°–90° hot mixture of 400 ml of ethylene glycol monomethylether and 100 ml of 2N sodium hydroxide solution. At the same temperature, an aqueous solution of bis-(diethylenetriamine)-cobalt(III) chloride, containing 4.0 g of cobalt, in 120 ml of water is added dropwise to this solution. The reaction mixture is stirred for 1 hour at 80°–90° whereupon the colour of the solution changes from blue to bordeaux. The mixture is poured into 2,000 ml of a 10% sodium chloride solution whereupon the cobalt complex of the above formula precipitates. It is filtered off, washed with dilute sodium chloride solution and dried. The yield is about 35 g.

The cobalt dyestuff of the above formula is a dark powder which dyes lacquers and fibres made from acetyl cellulose in bordeaux coloured, transparent shades having good fastness to light.

If, instead of the azo dyestuff mentioned above, one of the dyestuffs mentioned in column 2 of the following Table III is used and, if instead of bis-(diethylenetriamine)-cobalt(III) chloride, one of the cobalt chelates mentioned in column 3 of the same Table is used then, with otherwise the same procedure as given in the Example, complex cobalt dyestuffs having good fastness to light are also obtained of the shades given in column 4 of the same Table.

Table III

| 1 No. | 2 azo dyestuff | 3 cobalt(III) chelate from | 4 shade in acetyl cellulose |
|---|---|---|---|
| 67. | 1-hydroxy-2-amino-4-methyl-sulphonyl-benzene → 2-hydroxy-naphthalene | diethylene-triamine | bordeaux |
| 68. | do. | N,N',N''-tri-ethyl-diethyl-ene-triamine | do. |
| 69. | do. | dipropylene-triamine | do. |
| 70. | do. | α,β-γ-triamino-propane | do. |
| 71. | do. | α,γ-diamino-β-(amino-methyl)-propane | do. |
| 72. | 1-hydroxy-2-amino-4-nitro-benzene → 2-hydroxy-naphthalene | diethylene-triamine | do. |
| 73. | 1-hydroxy-2-amino- | diethylene- | blue-violet |

Table III-continued

| 1 No. | 2 azo dyestuff | 3 cobalt(III) chelate from | 4 shade in acetyl cellulose |
|---|---|---|---|
| | 5-nitro-benzene → 2-hydroxy-naphthalene | triamine | |
| 74. | do. | N,N-bis(β-phenylamino-ethyl)-ethylamine | do. |
| 75. | do. | N,N-bis-(β-N'-piperidino-ethyl)-ethyl-amine | do. |
| 76. | 1-hydroxy-2-amino-4-nitro-6-acetyl-aminobenzene → 2-hydroxy-naphthalene | diethylene-triamine | bordeaux |
| 77. | 1-hydroxy-2-amino-4-amyl-6-nitro-benzene → 2-hydroxy-naphthalene | do. | do. |
| 78. | 1-hydroxy-2-amino-benzene-4-sulphonic acid amide → 2-hydroxy-naphthalene-3-carboxylic acid-N-phenylamide | do. | do. |
| 79. | 1-hydroxy-2-amino-benzene-4-sulphonic acid-N-methylamide → 2-hydroxy-naphthalene-3-carboxylic acid ethyl ester | do. | do. |
| 80. | 1-hydroxy-2-amino-benzene-4-sulphonic acid, N,N-bis-(β-hydroxy-ethyl)-amide → 2-hydroxy-2-carbomethoxyamine-naphthalene | do. | do. |
| 81. | 1-hydroxy-2-amino-4-methyl-benzene → 2-hydroxy-naphthalene-6-sulphonic acid-N-methyl-N-(β-hydroxyethyl)-amide | diethylene-triamine | bordeaux |
| 82. | 2-amino-4-chloro-benzoic acid → 2-hydroxy-naphthalene | do. | do. |
| 83. | 1-amino-2-(methyl-sulphonyl-amino)-benzene → 2-hydroxy-naphthalene | do. | do. |
| 84. | 1-amino-2-hydroxy-4-methyl-benzene → 2-ethylamino-naphthalene | do. | blue-grey |
| 85. | do. | 2,2'-diamino-diphenylamine | do. |
| 86. | do. | 2,2'-diamino-dicyclo-hexyl-amine | do. |
| 87. | 1-amino-2-hydroxy-4-nitro-benzene → 2-ethylamino-naphthalene | diethylene-triamine | blue-green |
| 88. | do. | 2,6-(di-2'-pyridyl)-pyridine | do. |
| 89. | do. | 2-methoxy-4,6-dihydrazino-1,3,5-triazine | do. |
| 90. | 1-amino-2-hydroxy-4-ethyl-sulphonyl-benzene → 2-phenyl aminonaphthalene | diethylene-triamine | blue-grey |
| 91. | do. | (2-pyridyl-methyleneamino-ethyl)-diethyl-amine | do. |
| 92. | 1-hydroxy-2-amino-4-methyl-5-(3'-sulphamido-phenyl-azo)-benzene → 2-hydroxy-naphthalene | diethylene-triamine | blue |
| 93. | do. | dipropylene-triamine | do. |
| 94. | do. | 1-(diethylamino)-2-(2'-pyridyl- | do. |

Table III-continued

| No. | azo dyestuff | cobalt(III) chelate from | shade in acetyl cellulose |
|---|---|---|---|
| 95. | do. | methyleneamino)-benzene 1-(dimethylamino)-2-(2'-pyridyl-methyleneamino)-cyclohexane | do. |
| 96. | 1-hydroxy-2-amino-4-nitro-benzene 1-hydroxy-3,4-dimethylbenzene | diethylene-triamine | brown |
| 97. | 1-hydroxy-2-amino-4-nitro-benzene 1-hydroxy-2-acetyl-amino-4-methyl-benzene → | do. | do. |
| 98. | 1-hydroxy-2-amino-4-ethyl-sulphonyl-benzene → 1-phenyl-3-methyl-5-pyrazol-ene | do. | yellow-orange |
| 99. | do. | 2-(2'-pyridyl-methylene-amino-methyl)-pyridine | do. |
| 100. | do. | 8-(2'-pyridyl-methylene-amino)-quinoline | do. |
| 101. | 1-hydroxy-2-amino-4-methyl-sulphonyl-benzene → 1-phenyl-3-methyl-5-amino-pyrazole | diethylene-triamine | red-brown |
| 102. | do. | 2,6-bis-(amino-methyl)-pyridine | do. |
| 103. | do. | 2,6-bis-(benzyl-amino-methylene)-pyridine | do. |
| 104. | 1-hydroxy-2-amino-4-nitro-benzene acetoacetic acid-(2-chloroanilide) | diethylene-triamine | yellow |

EXAMPLE 105

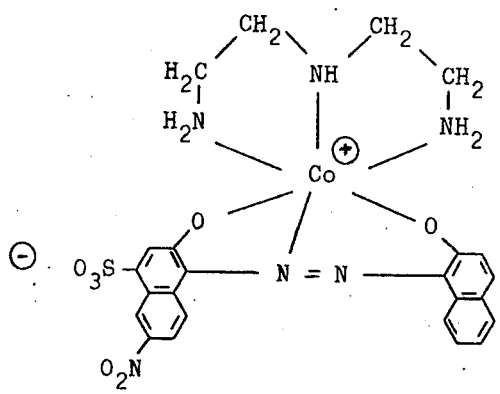

43.9 g of the azo dyestuff 2-hydroxy-1-amino-6-nitronaphthalene-4-sulphonic acid → 2-hydroxynaphthalene and 8 g of sodium hydroxide are boiled in 2000 ml of water and then added to a solution of bis-(diethylenetriamine)-cobalt(III) chloride, containing 5.9 g of cobalt.

The complex cobalt-containing dyestuff of the above formula precipitates. This cobalt dyestuff is filtered off, washed with water and dried. About 59 g of a blue-black powder are obtained.

If the above reaction is performed on wool fibres according to Example 156, then violet-black dyeings having good fastness to wet and light are obtained thereon.

Valuable complex cobalt dyestuffs are also obtained if, instead of the azo dyestuff mentioned above, one of the azo dyestuffs given in column 2 of the following Table IV is used and, if instead of bis-(diethylenetriamine)-cobalt(III) chloride, one of the cobalt chelates mentioned in column 3 of the same Table is used and the conditions given in this Example are kept. The shades of the cobalt complexes are given in column 4 of the same Table.

Table IV

| No. | azo dyestuff | cobalt chelate from | shade of cobalt complex |
|---|---|---|---|
| 106. | 1-amino-2-hydroxy-naphthalene-4-sulphonic acid → 2-hydroxy-naphthalene | diethylene-triamine | grey-violet |
| 107. | do. | dipropylene-triamine | do. |
| 108. | do. | N,N',N''-tri-ethyl-diethyl- | do. |

Table IV-continued

| 1 No. | 2 azo dyestuff | 3 cobalt chelate from | 4 shade of cobalt complex |
|---|---|---|---|
| 109. | do. | enetriamine 2,2'-diamino-diphenyl-amine | do. |
| 110. | do. | 2,6-bis-(amino-methyl)-pyridine | do. |
| 111. | do. | α,β,γ-triamino-propane | do. |
| 112. | do. | α,γ-diamino-β-(aminomethyl)-propane | do. |
| 113. | do. | 2-amino-4,6-di-hydrazino-1,3,5-triazine | do. |
| 114. | 1-amino-2-hydroxy-6-nitro-naphthalene-4-sulphonic acid → 1-hydroxy-naphthalene | diethylene-triamine | brown-black |
| 115. | 1-hydroxy-2-amino-4-chloro-benzene-6-sulphonic acid → 1,5-dihydroxy-naphthalene | do. | grey-violet |
| 116. | 1-hydroxy-2-amino-4,6-dinitro-benzene → 1-hydroxy-naphthalene-5-sulphonic acid | do. | brown-black |
| 117. | 1-hydroxy-2-amino-4-methylbenzene-6-sulphonic acid → 2-hydroxy-naphthalene | do. | red-violet |
| 118. | 1-hydroxy-2-amino-4-chloro-benzene alcaline → 1-hydroxy-7-amino-naphthalene-3-sulphonic acid | do. | violet |
| 119. | 1-hydroxy-2-amino-4-methyl-6-nitro-benzene → 6-hydroxy-2-acetylamino-naphthalene-8-sulphonic acid | do. | grey-blue |
| 120. | 1-hydroxy-2-amino-4-nitro-benzene → 2-hydroxy-6-(4'-methylphenyl-sulphonylamino)-naphthalene-8-sulphonic acid | do. | do. |
| 121. | 1-hydroxy-2-amino-4-chloro-benzene-6-sulphonic acid 2-hydroxy-8-acetyl-amino-naphthalene | do. | do. |
| 122. | 1-hydroxy-2-amino-4-methyl-5-(3'-sulpho-4'-chloro-phenylazo)-benzene → 2-hydroxy-naphthalene | do. | blue-green |
| 123. | 1-hydroxy-2-amino-4-(4'-sulpho-phenyl-azo)-benzene → 2-hydroxy-naphthalene | do. | brown |
| 124. | 1-amino-2-hydroxy-naphthalene-4-sulphonic acid → 1,3-dihydroxybenzene | do. | brown-black |
| 125. | 1-hydroxy-2-amino-6-methylbenzene-4-sulphonic acid → 1,3-dihydroxybenzene | do. | red-violet |
| 126. | 1-hydroxy-2-amino-4-methyl-6-nitro-benzene → 1-(4'-sulphophenyl)-3-methyl-5-pyrazolone | do. | red |
| 127. | 1-hydroxy-2-amino-6-nitro-benzene-4-sulphonic acid → 1-(3'-chlorophenyl)-3-methyl-5-pyrazolone | do. | do. |
| 128. | 1-amino-2-hydroxy-naphthalene-4-sulphonic acid → 1-phenyl- | do. | do. |

Table IV-continued

| No. | azo dyestuff | cobalt chelate from | shade of cobalt complex |
|---|---|---|---|
| 129. | 3-methyl-5-pyrazolone 1-hydroxy-2-amino-4-nitro-benzene → 1-(4'-sulphophenyl)-3-methyl-5-pyrazolone | do. | orange |
| 130. | 1-hydroxy-2-amino-4-nitro-benzene-6-sulphonic acid → 1-(3'-chlorophenyl)-3 methyl-5-pyrazolone | do. | do. |
| 131. | 1-hydroxy-2-amino-4-(3'-sulphophenyl-sulphonyl)-benzene → 1-phenyl-3-methyl-5-pyrazolone | do. | do. |
| 132. | 1-hydroxy-2-amino-6-nitro-benzene-4-sulphonic acid → acetoacetic acid-(2-chloro-anilide) | do. | yellow |
| 133. | 1-hydroxy-2-amino-6-methyl-benzene-4-sulphonic acid 2-hydroxy-naphthalene | do. | red-violet |
| 134. | 1-hydroxy-2-amino-benzene-4-sulphonic acid → 1,5-dihydroxy-naphthalene | do. | brown black |
| 135. | 1-hydroxy-2-amino-4,6-dinitro-benzene → 2-acetylamino-6-hydroxy-naphthalene-8-sulphonic acid | do. | olive |
| 136. | 1-hydroxy-2-amino-4-(3'-sulphophenyl-azo)-benzene 2-hydroxy-naphthalene | do. | brown |
| 137. | 1-amino-2-hydroxy-naphthalene-4-sulphonic acid → 1-hydroxy-naphthalene | do. | brown-black |

EXAMPLE 138

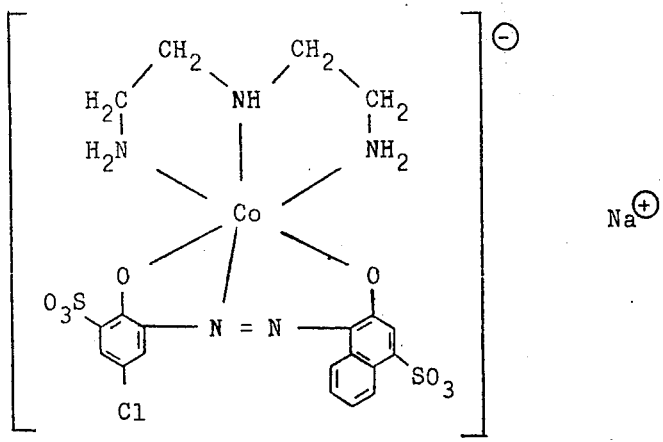

45.9 g of the azo dyestuff 1-hydroxy-2-amino-4-chlorobenzene-6-sulphonic acid → 2-hydroxy-naphthalene-4-sulphonic acid are slurried in 250 ml of water and 25 ml of 2N sodium hydroxide solution and the mixture is boiled. An aqueous solution of bis-(diethylenetriamine)-cobalt(III)chloride, containing 5.9 g of cobalt, is added to this grey-blue suspension and the whole is boiled until the colour remains constant.

The complex cobalt-containing dyestuff of the above formula is obtained in the form of a violet aqueous solution. A sample passes through an aluminium oxide chromatograph column as a violet-coloured zone using methanol as solvent.

With the addition of sulphuric acid, the dyestuff solution can be used direct for the dyeing of wool. Violet dyeings having good fastness to light are obtained.

The dyestuff of the above formula is isolated, the liquid present evaporated and the dyestuff is obtained as residue in the form of a shimmering black powder.

If, instead of the azo dyestuff mentioned above, one of the azo dyestuffs mentioned in column 2 of the following Table V is used and, if instead of bis-(diethylenetriamine)-cobalt(III) chloride, one of the cobalt chelates given in column 3 of the same Table is used, then, with otherwise the same procedure as described in the Example, complex cobalt-dyestuffs are obtained the aqueous solutions of which also dye wool in shades which have good fastness to light. The shades are given in column 4 of the Table.

Table V

| 1<br>No. | 2<br>azo dyestuff | 3<br>cobalt (III)<br>chelate from | 4<br>shade on<br>wool |
|---|---|---|---|
| 139. | 1-hydroxy-2-amino-4-chlorobenzene → 1,8-dihydroxy-naphthalene-3,6-disulphonic acid | diethylene-triamine | blue-violet |
| 140. | do. | dipropylene-triamine | do. |
| 141. | do. | α,β,γ-triamino-propane | do. |
| 142. | 1-hydroxy-2-amino-4-methyl-6-nitro-benzene → 1,8-dihydroxy-naphthalene 3,6-disulphonic acid | diethylene-triamine | blue |
| 143. | do. | α,γ-diamino-β-(amino-methyl)-propane | do. |
| 144. | 1-hydroxy-2-amino-4-chloro-benzene-6-sulphonic acid → 1-hydroxy-naphthalene-5-sulphonic acid | diethylene-triamine | red-violet |
| 145. | do. | (2-pyridyl-methylene-amino-ethyl)-diethyl-amine | do. |

EXAMPLE 146

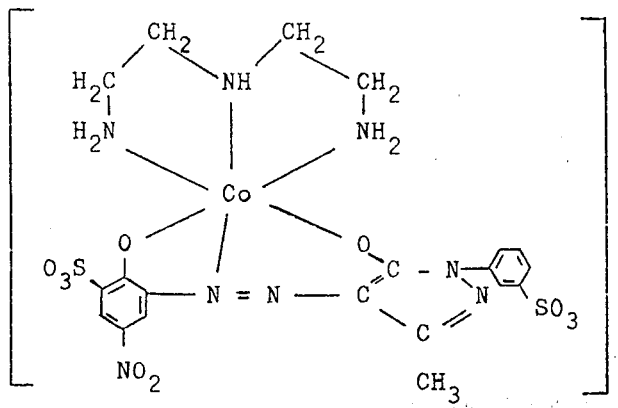

49.5 g of the azo dyestuff 1-hydroxy-2-amino-4-nitro-benzene-6-sulphonic acid → 1-(3'-sulphophenyl)-3-methyl-5-pyrazolone are slurried in 4000 ml of water and the mixture heated to the boil. To this mixture is added an aqueous solution of bis(diethylenetriamine)-cobaltIII chloride containing 7.1 g cobalt, and the whole is boiled until the colour remains constant. A complex cobalt-containing dyestuff of the above formula is produced in the form of a brown suspension. By addition of natrium chloride the dyestuff is completely separated. After filtering and drying, a dark-brown powder is given which dyes wool from a sulphuric acid solution in orange-brown, light fast shades.

If, instead of the azo dyestuff initially mentioned one of the dyestuffs given in column 2 of the following Table VI, and if instead of bis(-diethylenetriamine)-cobalt(III) chloride one of the cobalt chelates given in column 3 of the same Table are used, and otherwise the same procedure is followed as given in the Example, complex cobalt azo dyestuffs are obtained of which the aqueous solutions dye wool in equally good light fast shades. The shades are given in column 4 of the Table.

Table VI

| 1<br>No. | 2<br>azo dyestuff | 3<br>cobalt (III)<br>chelate from | 4<br>shade on<br>wool |
|---|---|---|---|
| 147. | 1-hydroxy-2-amino-4-chloro-benzene-6-sulphonic acid → 1-(3'-sulphophenyl)-3-methyl-5-pyrazolone | diethylene-triamine | orange |
| 148. | do. | N,N''-dibenzyl-diethylenetriamine | do. |
| 149. | do. | 2,6-bis-(amino-methyl)-pyridine | do. |
| 150. | 1-hydroxy-2-amino-4-nitro-benzene-6-sulphonic acid → 1-phenyl-5-pyrazolone-3-carboxylic acid | diethylene- | do. |
| 151. | 1-hydroxy-2-amino-4-chloro-benzene-6-sulphonic acid → 1-(3'-sulphophenyl)-3-methyl-5-amino-pyrazol | do. | brown |
| 152. | do. | dipropylene-triamine | do. |

EXAMPLE 153

2 g of the complex cobalt dyestuff obtained according to Example 1 are slurried with 2 g of 40% acetic acid and 4,000 ml of hot water. 2 g of sodium acetate and 4 g of a condensation product of oleyl alcohol and 15 mols of ethylene oxide are added to this mixture and 100 g of polyacrylonitrile fibres are introduced. The bath is heated to 90° within 30 minutes, kept at this temperature for 10 minutes and the fibres are dyed at the boil for 1 hour. The goods so treated are then soaped for 15 minutes at 80° in 5,000 ml of water with the addition of a sulphonated fatty acid condensation product, then rinsed and dried. The polyacrylonitrile fibres are dyed in orange shades which have good fastness to washing and light.

EXAMPLE 154

2 g of the acetone-soluble cobalt-containing dyestuff produced according to Example 66 are sprinkled into 1,000 g of a solution of acetyl cellulose in acetone, which solution has a solid content of 26%.

After the addition of 20 ml of acetone, the mixture is rotated in a well closed flask until the dyestuff is completely dissolved. The dyed solution is then extruded through dies. The fibre so formed is passed through a heated tube and then wound up. The bordeaux coloured acetylcellulose fibres have good fastness to wet and light.

EXAMPLE 155

2 g of the dyestuff obtained according to Example 138 are dissolved in 4,000 ml of warm water and 2 ml of 50% sulphuric acid are added to the solution. 100 g of wool are introduced into the 40° warm dyebath. The bath is brought to the boil within 30 minutes and the goods are dyed at the boil for 30 minutes. 10 ml of 50% sulphuric acid are then added to the bath and dyeing is continued for another 60 minutes at the boil. The goods so treated are then well rinsed with water and dried. The wool is dyed in a violet shade which has good fastness to light.

EXAMPLE 156

0.8 g of the azo dyestuff 1-hydroxy-2-amino-4-methyl-6-nitro-benzene → 6-hydroxy-2-acetylamino-naphthalene-8-sulphonic acid are dissolved in 4,000 ml of warm water. 2 ml of 40% acetic acid and 5 g of anhydrous sodium sulphate are added to this solution. 100 g of wool are introduced into the 40° warm dyebath. The bath is brought to the boil within 30 minutes and the wool is dyed at the boil for half an hour. Then 1.5 ml of 85% formic acid are added and the bath is kept for another 30 minutes at the boil. A neutral aqueous solution of bis-(diethylenetriamine)-cobalt(III) chloride, containing 0.12 g of cobalt, and 1 g of hexamethylenetetramine is added to the exhausted bath and the goods are dyed for another 30 minutes at the boil. The dyed goods are then rinsed with water and dried. A wool dyeing having a strong, grey-violet shade which has good fastness to washing and light is obtained.

If the azo dyestuff mentioned in this Example is replaced by the same amount of an azo dyestuff given in column 2 of Table IV and the procedure is otherwise the same, then wool dyeings of the shades given in column 4 of the same Table are obtained. The dyeings have good wet fastness properties.

We claim:

1. A betainic cobalt complex dyestuff of the formula

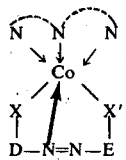

wherein the symbol

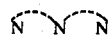

represents a member selected from the group consisting of diethylenetriamine, dipropylenetriamine and monoethylene-mono-propylene-triamine, said triamines being unsubstituted or N-lower alkyl-substituted,
α,β,γ-triaminopropane,
α,β,δ-triaminobutane,
α,γ-diamino-β-(aminomethyl)-propane,
N,N-bis-(β-phenylaminoethyl)-N-ethylamine,
N,N''-dibenzyldiethylenetriamine,
N,N-bis-(β-N'-piperidinoethyl)-N-ethylamine,
1-amino-2-(β-amino-ethylamino)-cyclohexane,
2,2'-diaminodicyclohexylamine,
1-amino-2-(β-amino-ethylamino)-benzene,
2,2'-diamino-diphenylamine,
2,6-(di-2'-pyridyl)-pyridine,
8-(2'-amino-phenylamino)-quinoline,
(2-pyridylmethylene-aminoethyl)-diethylamine,
1-(diethylamino)-2-(2'-pyridyl-methylene-amino)-benzene,
1-(dimethylamino)-2-(2'-pyridyl-methylene-amino)-cyclohexane,
2-(2'-pyridyl-methylene-amino-methyl)-pyridine,
8-(2'-pyridyl-methyleneamino)-quinoline,
2,6-bis-(benzyl-aminomethylene)-pyridine,
2,6-bis-(aminomethyl)-pyridine,
pyridine-2,6-dialdehyde dioxime,
pyridine-2,6-dialdehyde-dihydrazone,
2-methoxy-4,6-dihydrazino-1,3,6-triazine and
2-amino-4,6-dihydrazino-1,3,5-triazine; and
wherein
—D—N=N—E— is the divalent radical of a dyestuff selected from a benzene-azo-benzene dyestuff, a benzene-azo-naphthalene dyestuff, a benzene-azo-(1-phenyl-5-hydroxy-pyrazole) dyestuff, a benzene-azo-(1-phenyl-5-amino-pyrazole) dyestuff, a benzene-azo-acylaceto-phenylamide dyestuff, a benzene-azo-benzene-azo-naphthalene dyestuff, a naphthalene-azo-naphthalene dyestuff and a naphthalene-azo-(1-phenyl-5-hydroxy-pyrazole) dyestuff, any substituents of said dyestuffs being selected from hydrogen, chlorine, brome, lower alkyl, lower alkoxy, nitro, hydroxyl, lower-alkyl-sulfonyl, phenylsulfonyl, methylphenylsulfonyl, methyphenylsulfonylamino, methylsulfonylamino, acetylamino, carbo-ethoxy-amino, a radical of the formula

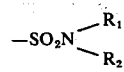

wherein
$R_1$ represents hydrogen, lower alkyl, hydroxyethyl, phenyl or lower alkylphenyl and $R_2$ represents hydrogen, lower alkyl or hydroxyethyl; carboxylic acid-N-phenylamide and lower alkyl carbonyl, phenoxycarbonyl, phenylazo or naphthylazo; and wherein one —SO₃⁻ group is attached to either D or E;

X is linked in ortho-position to the azo bridge to a ring carbon atom of D and represents —O—, —COO— or lower-alkylsulfonamido, and X' is linked in ortho-position to the azo bridge to a ring carbon atom of E and represents —O—, —N—(lower alkyl)—, —N—(hydroxy-lower-alkyl), —N—(phenyl)— or —NH—, said dyestuff being capable of forming a bicyclic metal complex with cobalt;

and wherein said lower alkyl and lower alkoxy moieties have from one to five carbon atoms.

2. A betainic cobalt complex dyestuff cobalt compound as defined in claim 1, containing as azo dyestuff radical a radical of the formula

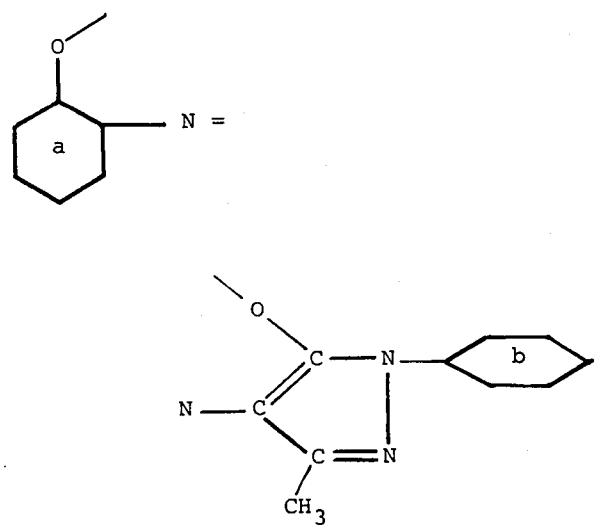

wherein one of the rings marked a and b contains a —SO₃⁻ group and any other substituents of the phenyl ring marked a are selected from hydrogen, chlorine, lower alkyl, nitro, lower alkylsulfonyl, phenylsulfonyl or a radical of the formula

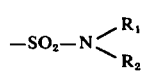

wherein R₁ and R₂ have the meanings given in claim 1 and any other substituents of the phenyl ring marked b are selected from hydrogen chlorine, lower alkyl, lower alkoxy, nitro, lower alkylsulfonyl or a radical of the formula

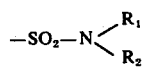

wherein R₁ and R₂ have the meaning given in claim 1.

3. A betanic dyestuff of the formula

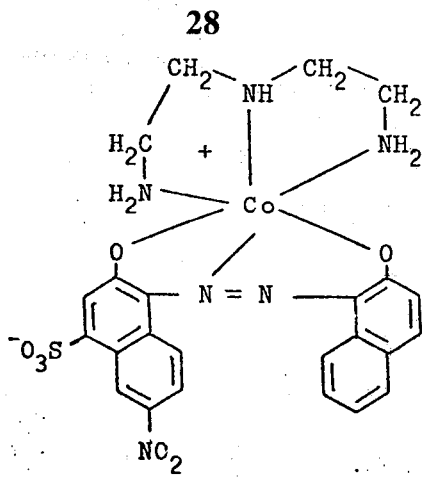

4. A betainic dyestuff of the formula

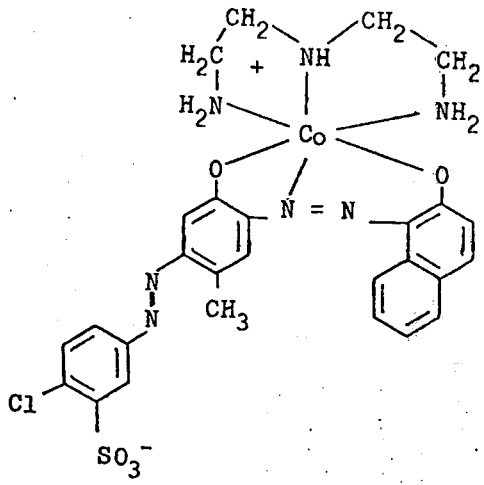

5. A betainic dyestuff of the formula

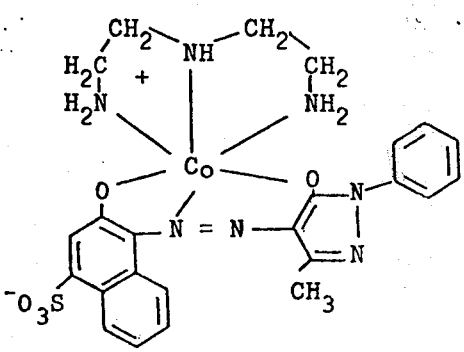

6. A betainic dyestuff of the formula

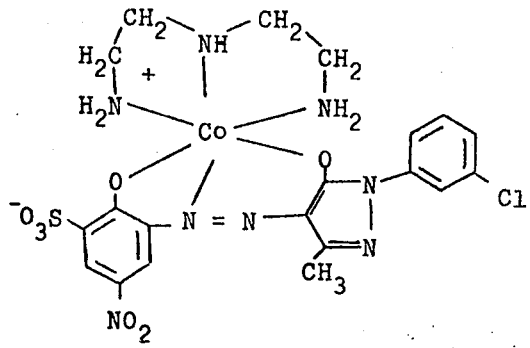

7. A betainic dyestuff of the formula
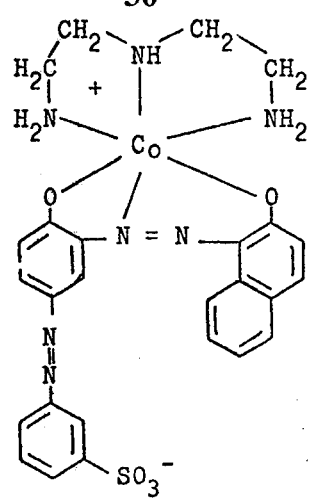
* * * * *